United States Patent [19]

Hull et al.

[11] 4,249,814
[45] Feb. 10, 1981

[54] FRUSTRATED TOTAL INTERNAL REFLECTION CAMERA SHUTTER

[75] Inventors: John R. Hull; Malvern K. Iles, both of Ames, Iowa

[73] Assignee: Iowa State University Research Foundation, Inc., Ames, Iowa

[21] Appl. No.: 80,382

[22] Filed: Oct. 1, 1979

[51] Int. Cl.³ .......................... G03B 9/08; G03B 19/12
[52] U.S. Cl. .................................... 354/154; 354/155; 354/227
[58] Field of Search ............... 354/152, 154, 155, 227, 354/224, 225; 352/141; 350/356, 363, 285

[56] References Cited

U.S. PATENT DOCUMENTS

| 2,455,763 | 12/1948 | Harrison | 354/227 X |
| 3,230,851 | 1/1966 | Reymond | 354/155 |

FOREIGN PATENT DOCUMENTS 2720859  11/1978  Fed. Rep. of Germany ........... 354/152

OTHER PUBLICATIONS

"Optical Modulation Developed For High-Power IR Laser", In Electronic Design, vol. 24, No. 25, pp. 36, 38, 12-1976.

*Primary Examiner*—John Gonzales
*Attorney, Agent, or Firm*—Zarley, McKee, Thomte, Voorhees & Sease

[57] ABSTRACT

An improved camera shutter system which employs the principles of frustrated total internal reflection as a means for controlling transmission of light to a camera film. The shutter is comprised of at least two prism elements, one facing the other and one movable with respect to the other, to allow a common adjoining surface to move from a closed position to an open position wherein the surfaces have a space or gap therebetween. When the surfaces are open having a space or gap in between, the gap is at least just slightly larger than a wave length of light, with the result being that light is reflected rather than transmitted from one prism to the other. When the gap is closed, light is transmitted directly through one prism into the other and from there to a film positioned behind the second prism.

14 Claims, 5 Drawing Figures

FRUSTRATED TOTAL INTERNAL REFLECTION CAMERA SHUTTER

BACKGROUND OF THE INVENTION

The field of this invention relates to camera shutters and more particularly to camera shutters of the mechanical type. Particularly, the invention relates to the device for controlling the emittance of light onto photographic film in common cameras, especially in single lens reflex type cameras. As will be seen hereinafter, the employment of the new type of camera shutter described and claimed herein permits exposure times over a large dynamic range and permits exposure times that are significantly less than obtainable by conventional mechanical shutters.

Currently, the most common shutters employed in cameras are mechanical shutters; that is, those which rely upon mechanical elements which obstruct the passage of light from the camera lens system on its pathway to the film. There are three main types of mechanical shutters commonly used. Those are between the lens shutters, behind the lens shutters, and focal point shutters. Generally, such mechanical shutters work by imposing an opaque object, usually metal foil, between the light of the outside world and photographic film. When a photographic record is desired, the opaque object is removed long enough to expose the film and then return to the closed position. Movement of mechanical shutters are usually powered by springs or electrically operated solenoids that move one or more metal foil blades.

In between the lens or behind the lens shutters, the blade movement, acceleration, stoppage and reversal of masses consume time and energy and limit the obtainable total exposure time to a minimum of 1/1000th or 1/2000th of a second. Higher speeds require stronger driving springs, and parts able to withstand the wear and tear. This results in a larger and costlier shutter.

A focal plane shutter is usually a slit moving across the film. At high speeds, fast moving objects will change position with various strips of exposure. At such speeds all conventional mechanical shutters, are likely to exhibit various distortions and seeming optical illusions. At high speeds, fast moving mechanical parts also cause the vibration of the camera which often blurs the photographed image.

From time to time experimental work has been accomplished on use of other than mechanical optical modulators in order to control the transmission of light through an aperture as a function of time. Some devices which have been experimented with include electrooptic modulators which employ electrical fields to induce bifringence in the shutter material, i.e., polarization of light passing through the device dependent upon voltage; acoustooptic modulators which employ sound waves to scatter and defract light; magnetooptic modulators which use magnetic fields to change the polarization or transmission of light, and the like. However, such systems have generally been extremely expensive and met with little or no success in the real commercial world of practical everyday usable cameras.

It can therefore be seen that a faster shutter in conventional inexpensive cameras could conceivably open a whole new realm of photography to both amateur and professional photographers. The use of such a faster and inexpensive shutter would allow good quality pictures of high speed. Areas of use and demand for such a shutter might include action sports and many natural phenomena. Additionally, high speed industrial processes could be successfully analyzed photographically. Also such a device could be used in movie cameras with high speed repetition rates and in scientific photography where low vibrations are required.

Accordingly, one object of this invention is to provide a new camera shutter which avoids the deficiencies of conventional mechanical shutters.

A more specific object of this invention is to provide camera shutters that are considerably faster than conventional mechanical shutters and can obtain shutter speeds within the range of $10^{-4}$s to $10^{-6}$s, considerably faster than conventional shutters which are ordinarily limited to $10^{-3}$s.

Yet another object of this invention is to provide a shutter which minimizes blur, distortion and optical paradoxes that often occur at high speeds with conventional mechanical shutters. Yet another object of this invention is to provide a shutter which requires less energy to operate than conventional mechanical shutters, thus freeing stored camera energy for accomplishing other tasks.

An even further object of the invention is to provide a much simpler shutter which employs no springs, cams, holding leafs or the like, thus significantly eliminating possibilities of mechanical failure.

A still further object of this invention is to provide a non-mechanical type shutter which can operate at high speeds with virtually no mechanical vibration.

Still another more specific object of the invention is to provide a camera shutter which employs frustrated total internal reflection principles to provide a shutter which has as its only movement the small expansion or contraction of piezoelectric ceramics which in turn move the prism components of the lenses from a light reflecting gap open position to a light transmitting gap closed position.

The method and manner of accomplishing these and other objects of the invention will become apparent from the detailed description which follows hereinafter.

BRIEF DESCRIPTION OF THE DRAWINGS

In FIG. 4 the system is open for viewing through the view finder.

SUMMARY OF THE INVENTION

This invention relates to camera shutters and more particularly to camera shutters which operate on the physical principle of frustrated total internal reflection. Frustrated total internal reflection occurs when two reflecting elements are separated by a narrow gap of material with a smaller index of refraction; radiation from within one element is incident upon the gap and providing the gap is greater than one wave length of the light which is received, the incident radiation is substantially totally reflected at the surface. However, when the gap is closed, the radiation at the surface is transmitted from one prism member to the other and from there may be transferred to a film for photographic purposes.

DETAILED DESCRIPTION OF THE INVENTION

Figure 2:
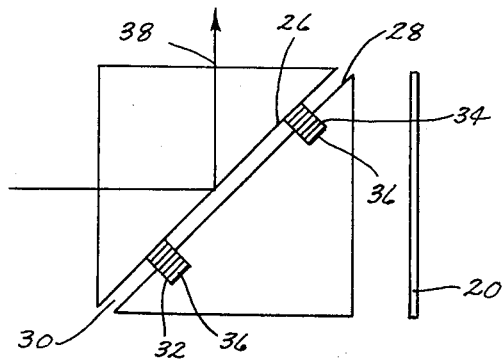
FIG. 2 shows the shutter of the camera of FIG. 1 in an open position.
Figure 5:
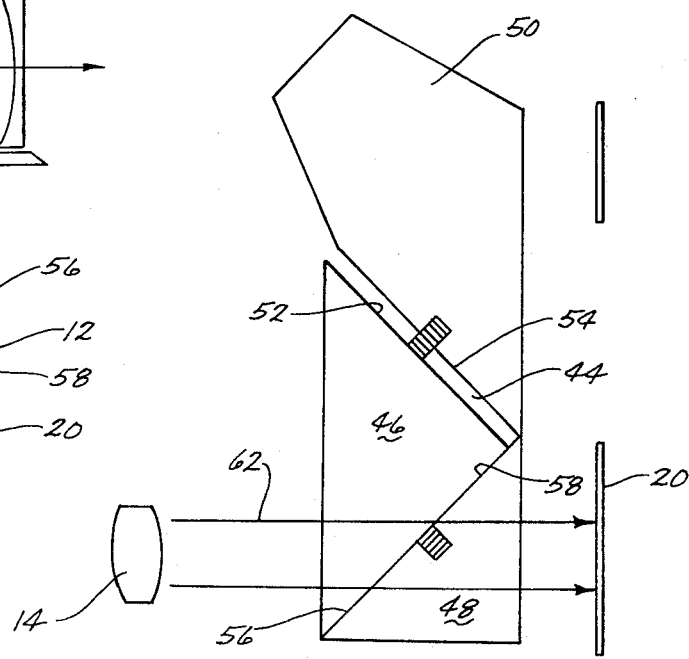
FIG. 5 shows an inside view of the shutter of FIG. 4 in closed position for light transmission to the film, and shows how light reflection from the view finder to the film is prevented by the second gap.

If two refracting elements are separated by a very narrow gap, as shown for example in FIGS. 2 and 5, and light radiation from within one element is incident on the gap at any angle exceeding critical, a certain fraction of the radiation will penetrate the gap into the other element. This penetration will be a function of the gap width and will decrease from 100% to negligible proportions as the gap opens up to a width equal to a few wave lengths of the incident radiation. Generally if the gap is at least just slightly greater than one wave length of the incident radiation, there will be substantially complete reflection. This effect is known as frustrated total internal reflection, and as seen hereinafter, is one means of strongly modulating a sizable aperture with a very small motion. For further details with regard to the basic principles of frustrated total internal reflection see Astheimer, et al. "Infra-red Modulation by Means of Frustrated Total Internal Reflection" *Applied Optics*, No. 5, No. 1, January, 1966, pages 87 through 91 which are incorporated herein by reference.

In other words, the amount of light which passes through one prism member into a second prism member can be controlled by regulating the gap between the two prism members. If the gap is less than one wave length of the light passing therein, some transmission will occur. If the gap is closed completely and the common surface of the two prisms are in substantially complete contact, virtually 100% of the light will pass through. If on the other hand, the gap is greater than one wave length, reflection in the first prism will occur and substantially no light will pass into the second prism. These principles are applied in accordance with the invention described below to achieve the objects of the invention hereinbefore expressed, as well as others.

As should be apparent to one of ordinary skill in the art, numerous means of employing the frustrated total internal reflection concept, other than those specifically depicted herein, may be employed to use such principles for a camera shutter. It is contemplated that those altered means which employ the basic concept of frustrated total internal reflection for shutter purposes are within the scope of the basic principles of the invention disclosed herein.

The invention will now be described with continuing reference to the drawings.

Figure 1:
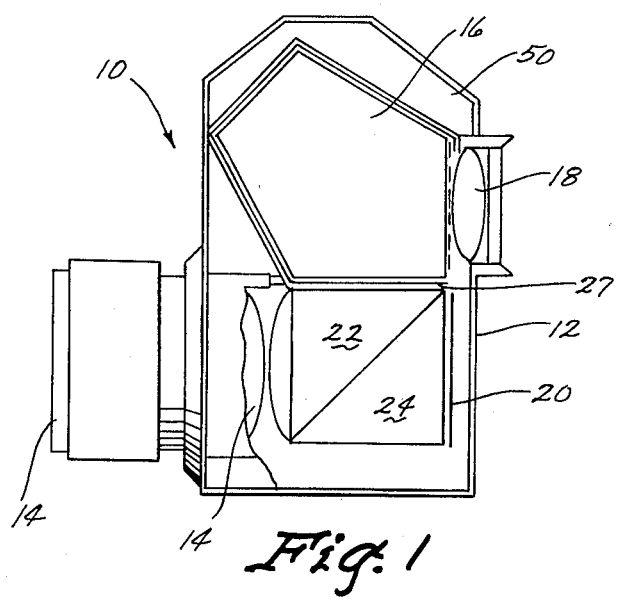
FIG. 1 is a side view using the single gap prism shutter and showing its location in a camera, relative to the other major camera components.
Figure 3:
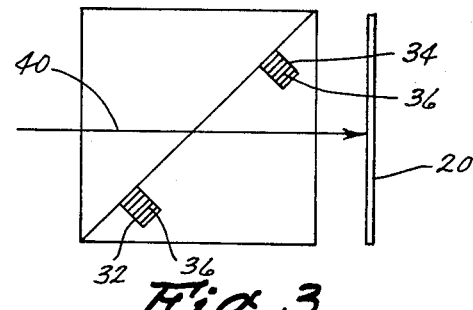
FIG. 3 shows the shutter of the camera of FIG. 1 in a closed picture taking position.

Looking first at FIGS. 1, 2 and 3, a camera, referred to generally at 10, is shown. The camera 10 is comprised of a conventional camera body 12 having an associated camera lens system 14 for receipt of light and images to be photographically recorded, a view finder system represented by pentaprism 16, and an ocular 18. As understood by those skilled in the art, and therefore not specifically depicted herein, mounted within the camera body 12 is a conventional film holder represented schematically in FIG. 1 by film surface 20.

The lens system comprising upper prism 22 and lower prism 24 is mounted, or interposed, between the lens system 14 and the film surface 20. As can be seen in FIG. 1, upper prism 22 and lower prism 24 are mounted so that their surfaces 26 and 28 are in opposing relationship.

Refracting prisms 22 and 24 are movable with respect to each other so that light may be reflected from surface 26 of upper prism 22 or, if the gap 30 (see FIG. 2) between surfaces 26 and 28 is closed (FIG. 3), light may be transmitted from upper prism 22 into prism 24 and from there to film surface 20, for recording of a photographic image.

If desired, in order to prevent light from returning through ocular 18 and being scattered to film 20, a mechanical shutter member 27 may be employed between upper prism 22 and pentaprism 16. However, this has not been found to be essential.

As can be seen in FIG. 2, small bores 32 and 34 are made perpendicular to surface 28 in lower prism 24. Inserted in bores 32 and 34 are a stacked in series group of piezoelectric ceramic transducers.

Piezoelectric transducers are crystalline materials which linearly expand and/or contract upon subjection to small electrical voltages. The amount of contraction or expansion is directly proportional to the applied voltage. And so transmission of a small electrical voltage to the piezoelectric transducers 36 of FIG. 2 cause them to either expand or in the case depicted contract from their normal position shown in FIG. 2 to a contracted position shown in FIG. 3. The result is that upper prism 26 is moved with respect to lower prism 24 causing the closing of gap 30.

A variety of piezoelectric materials may be used for transducers 36; for example, crystals of quartz, tourmalin, Rochelle salt, and lead zirconate titanate. Since lead zirconate titanate has the largest piezoelectric coefficient known, that is, the greatest expansion is caused by the smallest amount of voltage, it is the preferred transducer 36. The most preferred one is manufactured by Mullard Ltd. of London.

As known by those familiar with piezoelectrics, they can be made to either expand or contract, upon receipt of electrical voltage depending upon their crystal orientation and the stacking arrangement. However, this is well known and will not be described in detail herein.

As depicted in FIGS. 2 and 3, the piezoelectric transducers 36 are stacked mechanically in series, but are electrically in parallel in order to reduce the maximum amount of necessary voltage required for expansion and contraction. The shutter can be completely electronically controlled with standard commercial components. Looking at FIG. 2, when an electrical impulse is received by transducers 36, they contract from the at-rest shutter closed position of FIG. 2 to the shutter open position of FIG. 3, with the surfaces 26 and 28 abutting to close gap 30. The result is that with respect to FIG. 2, incident light rays 38 are reflected through upper prism 24 and never enter lower prism 24. As a result, film surface 20 remains in an unexposed condition. However, when transducers 36 contract, gap 30 closes, as shown in FIG. 3, and incident light 40 passes through upper prism 24, into lower prism 24, and through the lower prism and contacts film surface 20 to expose the film.

It can therefore be seen that the shutter can be completely electronically controlled by simply introducing electrical stimuli from a conventional battery to transducers 36.

Additionally, the minimum width of gap 30 should be just greater than one wave length of the light in order to provide for reflection as depicted at 38 in FIG. 2. This is very small gap and generally ranges from about 5,000 Angstroms up to about 25,000 Angstroms, with about three to four wave lengths of light, that is 15,000 Angstroms to 20,000 Angstroms being preferred. As can be appreciated, this is an extremely small distance, with the result being that only a very slight amount of movement of upper prism 22 with respect to lower prism 24 results in a complete opening or closing of the shutter system. This very small movement can be made quickly and efficiently without mechanical failures and without customary restraints upon mechanical systems. Additionally, since the movement is very small, it causes no internal camera vibrations and the resulting picture defects such as blurring of images which occur with vibrations.

The material from which upper prism 22 and lower prism 24 can be made is conventional prism material for cameras such as quartz or glass. The only criteria is that surfaces 26 and 28 where the prisms join when the shutter is in closed position as depicted in FIG. 3, must be polished as smooth as possible since the amount of transmitted light depends upon the completeness of contact. Thus, the surfaces must be highly polished. It is also contemplated that these surfaces could be coated with a resilient light transparent coating material in order to assure complete contact.

Figure 4:
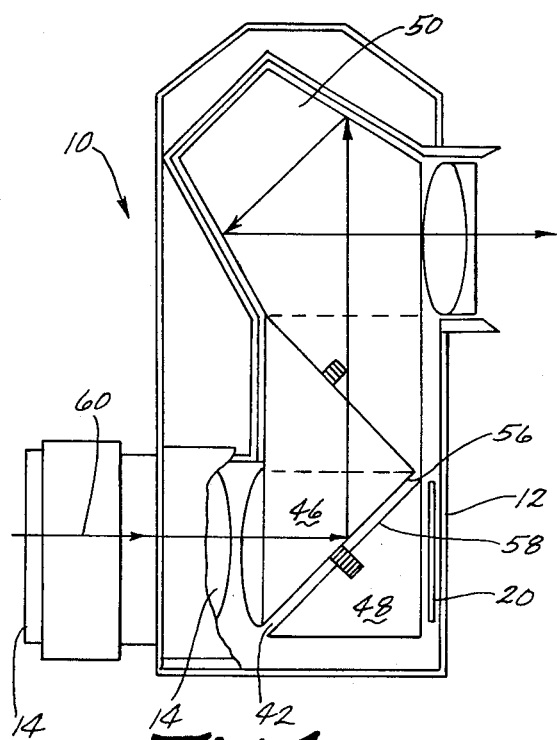
FIG. 4 shows the side view of an alternative preferred embodiment for use with single lens reflex cameras, which employs two frustrated total internal reflection gaps in the shutter system.

Turning now to FIGS. 4 and 5, there is shown a preferred system for use with single lens reflex cameras. The system is preferred because it prevents, or at least substantially minimizes, light from entering ocular 18 and being transmitted through the shutter system to film surface 20.

In connection with FIGS. 4 and 5, the same numerals used with respect to FIGS. 1, 2 and 3 will be used to designate common parts. As can be seen, in FIGS. 4 and 5, a shutter system employing two shutter gaps 42 and 44 is employed. The lens system comprises an upper prism 46 which in side elevational section as depicted in FIGS. 4 and 5 is a right triangle with its hypotenuse facing lens system 14. The second shutter component is bottom prism 48 and the third component is pentaprism 50. And so, upper surface 52 of upper prism 46 and lower surface 54 of pentaprism 50 define a first gap and lower surface 56 of upper prism 46 and upper surface 58 of bottom prism 48 define a second or lower gap 42. Upper gap 44 and lower gap 42 are independently and variably movable from open to close positions by ceramic piezoelectric transducers 32 and 34 of like construction and mounting as depicted with respect to FIGS. 1, 2 and 3.

Looking first at FIG. 4, it can be seen that gap 42 is open and thus light transmitted through lens system 14 is prevented from reaching film surface 20. Rather, the transmitted light 60 hits surface 56 and is reflected at a right angle through upper prism 46, and since upper gap 44 is closed, into pentaprism 50 and from there through ocular 18 to the eye of the camera user.

However, when the user of the camera takes a picture, the transducer between upper prism 46 and 54 opens in order to prevent light from the ocular being transmitted back to the film. Virtually, immediately upon opening of top gap 44, bottom gap 42 is closed and light from lens system 14 passes through lower prism 48 as indicated by arrow 62 to film 20.

The sequential timing of openings and closings for gaps 42 and 44 is by conventional logic devices and switching means. The sequence of operation in taking a picture is as follows: Gap 44 opens, gap 42 closes for the time duration indicated by the selected shutter speed, gap 42 opens and gap 42 closes so that the camera user may once again view the image through lens system 14. The advantage of this double gap system is that it prevents any back flow of light from the view finder ocular 18 through pentaprism 50 and upper prism 46, as well as lower prism 48 back to film surface 20.

It therefore can be seen that the camera is employing a frustrated total internal reflection shutter system with modulation accomplished by ceramic piezoelectric transducers, to accomplish at least all of the stated objects of the invention.

The shutters utilizing piezoelectrics can have the relative timing and duration control completely electronically accomplished using standard commercial components. A light detector and a voltage comparator can be used to adjust the voltage from the piezoelectrics to compensate for temperature expansion. The shutters can be operated, sequenced and timed in duration entirely by this electronic means.

Additionally, shutter times that are considerably faster than conventional mechanical shutters are obtainable. The shutter of this invention can easily obtain shutter speeds within the range of $10^{-4}$s to $10^{-7}$s. Blur, distortion and optical paradoxes are eliminated, vibration is eliminated; risk of failure of mechanical components is substantially minimized, and all of these features are attained in an economical unit.

What is claimed is:

1. In a camera having a camera body associated with a lens system for receipt of light and images to be photographically recorded, a view finder for viewing what the lens system receives, a film holder used in recording images on film, and a shutter interposed between the lens system and the film holder, the improvement comprising, a frustrated total internal reflection shutter having at least two refracting prisms which are movable with respect to each other from light reflecting, open or gapped positions to light transmitting, or closed, surface contact positions, the surfaces of said prisms defining first and second gaps between said prisms, each of said gaps being independently movable with respect to the other, the first gap being interposed between the lens system and the film holder to control light transmission to the film, and said second gap being interposed between the lens system and the view finder to control light transmission between the lens system and the view finder.

2. The camera of claim 1 wherein means are provided for moving said prisms with respect to each other, said means comprising piezoelectric transducers.

3. The camera of claim 2 wherein said piezoelectric transducers are press fit into small bores in the surface of at least one of said prisms.

4. The camera of claim 3 wherein said piezoelectric transducers are actuated to move to an expanded position by an electric means associated with said camera body.

5. The camera of claim 1 wherein said light reflecting gap is at least the length of one wave length of light.

6. The camera of claim 5 wherein said gap ranges in width from about 500 Angstroms to about 25,000 Angstroms.

7. The camera of claim 6 wherein said gap ranges from about 15,000 Angstroms to 20,000 Angstroms.

8. The camera of claim 3 wherein said transducers are adhesively adhered into said small bores.

9. The camera of claim 8 wherein said piezoelectric transducers are selected from those piezoelectric materials which expand and contract most rapidly, as well as the greatest amount, by actuation with a minimum of electrical voltage.

10. The camera of claim 9 wherein said transducer is a lead zirconate titanate piezoelectric crystal material.

11. The camera of claim 1 wherein said camera is a single lens reflex camera.

12. The camera of claim 11 wherein each of said gaps are independently movable with respect to each other.

13. The camera of claim 12 wherein gaps are each associated with an electronic logic device so that when said first gap is closed, said second gap is open and when said second gap is open, said first gap is closed.

14. The camera of claim 1 wherein the surface of each of said prisms which come into contact are coated with a resilient light transparent coating.

* * * * *